US008275582B1

(12) United States Patent
Vidmar et al.

(10) Patent No.: US 8,275,582 B1
(45) Date of Patent: Sep. 25, 2012

(54) METHOD AND SYSTEM FOR CLOCK SYNCHRONIZATION USING TEMPLATED ADAPTIVE MANEUVER DETECTION

(75) Inventors: Anthony Vidmar, Wyndmoor, PA (US); Daniel P. Bergen, Belford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 444 days.

(21) Appl. No.: 12/511,467

(22) Filed: Jul. 29, 2009

Related U.S. Application Data

(60) Provisional application No. 61/084,800, filed on Jul. 30, 2008.

(51) Int. Cl.
*H03F 1/26* (2006.01)
*G01C 17/38* (2006.01)
*G01C 21/10* (2006.01)

(52) U.S. Cl. ............... 702/189; 73/1.77; 701/536

(58) Field of Classification Search .......... 702/189, 702/33, 35, 81, 84–85, 92, 94–95, 108, 113, 702/115–116, 127, 141, 145–147, 150–153, 702/179, 182–183, 185, 190–191, 193–195, 702/199; 73/1.37–1.38, 1.75–1.79, 178 R, 73/488, 503.3, 504.02–504.03, 504.08–504.09, 73/514.01–514.02, 514.15; 74/5 R, 5.2, 74/5.34, 5.4; 701/200, 220, 400, 518, 534, 701/536
See application file for complete search history.

(56) References Cited

U.S. PATENT DOCUMENTS

| 4,542,647 A | 9/1985 | Molnar |
| 4,634,283 A | 1/1987 | Mark et al. |
| 5,434,670 A | 7/1995 | Albers et al. |
| 5,442,442 A | 8/1995 | Kanegsberg et al. |
| 6,354,163 B1 * | 3/2002 | Heiberg ................ 74/5.47 |
| 6,721,657 B2 * | 4/2004 | Ford et al. ................ 701/213 |
| 7,089,150 B2 | 8/2006 | Phillips, III |

OTHER PUBLICATIONS

Clark et al., A Functionally Redundant Altimeter, Jul. 1976, IEEE Transactions on Aerospace and Electronic Systems, vol. AES-12, No. 4, pp. 459-463.*

* cited by examiner

*Primary Examiner* — Toan M Le
(74) *Attorney, Agent, or Firm* — Howard IP Law Group, PC

(57) ABSTRACT

A method and system for estimating the inception of gimbal motion of an inertial measurement unit (IMU), includes independently filtering, in a computer process, three-axis angular orientation rate information or data from component gyroscopes in the IMU, to provide a first output; adaptively detecting, in another computer process, discontinuities in the first output; estimating a regularity of gimbal motion to provide a second output; and comparing the discontinuities detected in the first output to the estimated regularity of gimbal motion provided in the second output, in another computer process, to determine which of the discontinuities detected in the first output are true discontinuities and which of the discontinuities in the first output that are false discontinuities, and to identify other discontinuities which have been missed in the first output. The true and missed discontinuities are estimates of the inception of gimbal motion of the IMU.

16 Claims, 6 Drawing Sheets

METHOD AND SYSTEM FOR CLOCK SYNCHRONIZATION USING TEMPLATED ADAPTIVE MANEUVER DETECTION

RELATED APPLICATION

This application claims the benefit of U.S. Provisional Application No. 61/084,800, filed Jul. 30, 2008, the entire disclosure of which is incorporated herein by reference.

GOVERNMENT RIGHTS

This invention was made with Government Support under Contract No. N00024-03-C-6110 awarded by the Department of the Navy. The Government has certain rights in this invention.

FIELD

The present disclosure relates to inertial navigation systems and inertial measurement units of inertial navigation systems. More particularly, the present disclosure relates to a method and system that estimates the inception of regular gyroscope gimbal motion of an inertial measurement unit.

BACKGROUND

Inertial navigation systems (INSs) supply navigation data for air, space, and water vehicles. One such INS that supplies navigation data for water vehicles is the AN/WSN-7.

A typical INS includes a computer and a gimbaled inertial measurement unit (IMU) for determining the position and velocity, attitude (roll, pitch and heading), and attitude rates of the vehicle. The gimbaled IMU may include a plurality of gyroscopes to measure vehicular angular rates about each of three axes. After receiving initial attitude data from an external source, the computer of the INS determines the attitude of the vehicle using attitude-change data received from the IMU.

Indexing is the periodic reorientation of IMU sensor axes in order to average out random walk errors in the accelerometers. In this process, the IMU is periodically rotated with roll and azimuth gimbals to another orientation. The order of gimbal motions repeats every certain number of orientations. The gimbal motion occurs over a certain time period.

Readout error in the orientation of the gimbals is a bias in the attitude determined by the gyroscopes. There are methods for estimating the biases in the roll, pitch and heading of INSs due to indexing. One known method is the Gyro Indexing Compensation Algorithm (GICA) that estimates the biases in the roll, pitch and heading of the earlier mentioned AN/WSN-7.

Accordingly, a method and system for estimating the onset of regular (up to clock drift) IMU gimbal motion is needed for use in bias estimation of the roll, pitch and heading outputs.

SUMMARY

A method is disclosed herein for estimating the inception of gimbal motion of an inertial measurement unit (IMU). The method comprises: independently filtering, in a computer process, three-axis angular orientation rate information or data from component gyroscopes in the IMU, to provide a first output; adaptively detecting, in another computer process, discontinuities in the first output; estimating a regularity of gimbal motion to provide a second output; and comparing the discontinuities detected in the first output to the estimated regularity of gimbal motion provided in the second output, in another computer process, to determine which of the discontinuities detected in the first output are true discontinuities and which of the discontinuities in the first output that are false discontinuities, and to identify other discontinuities which have been missed in the first output.

Also disclosed herein is a system for estimating the inception of gimbal motion of an inertial measurement unit (IMU). The system comprises: a filter unit for independently filtering gyroscope three-axis angular orientation rate information or data from component gyroscopes in the IMU, to provide a first output; a detector unit for adaptively detecting discontinuities in the first output; a regular gimbal motion estimating unit for estimating a regularity of gimbal motion to provide a second output; a comparator unit for comparing the discontinuities detected in the first output to the estimated regularity of gimbal motion provided in the second output to determine which of the discontinuities detected in the first output are true discontinuities and which of the discontinuities in the first output that are false discontinuities, and to identify other discontinuities which have been missed in the first output.

In both the method and the system, the true and missed discontinuities are estimates of the inception of gimbal motion of the IMU.

DETAILED DESCRIPTION

Figure 1:
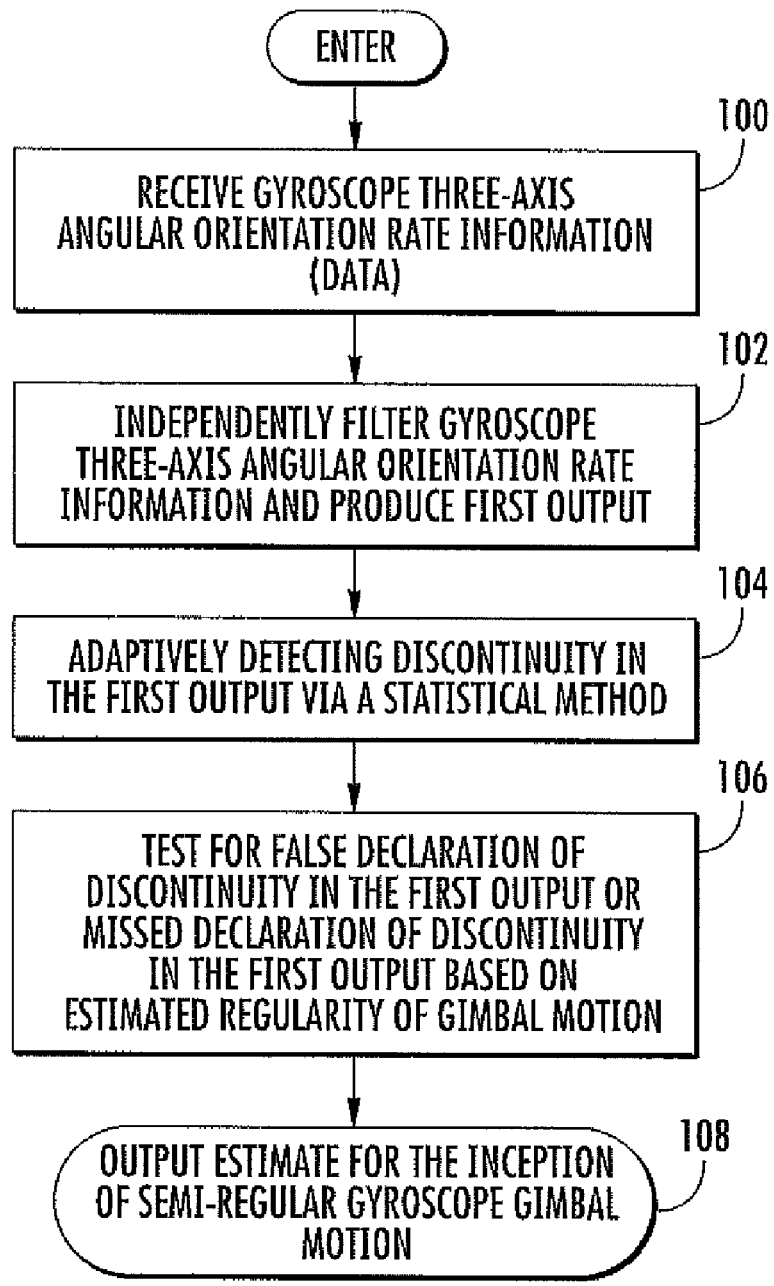
FIG. 1 is a logic flow diagram illustrating an exemplary embodiment of a templated adaptive maneuver detection method for clock synchronization.

FIG. 1 is a logic flow diagram illustrating an exemplary embodiment of a templated adaptive maneuver detection method for clock synchronization of a gimbal clock with an inertial navigation system (INS) system clock. The method estimates the inception of semi-regular gyroscope gimbal motion of one or more gyroscopes of one or more inertial measurement units (IMU). In block 100, gyroscope three-axis (roll, pitch, and heading) angular orientation rate information or data is received from an INS that is in data communication with the one or more IMUs. The three-axis angular orientation rate information is then independently filtered in block 102 to produce a first output that comprises a residual metric computed for each of the angular orientation rate estimates. In one embodiment, the filtering may be performed by an adaptive Kalman filter. In other embodiments, the filtering may be performed by a conventional non-adaptive Kalman filter.

The inception or beginning time of regular gyroscope gimbal motion (beginning gimbal motion time) is estimated in block 104 by adaptively detecting discontinuity in the first output, via a statistical method. In one embodiment, the beginning gimbal motion time may be estimated using a chi-squared $\chi^2$ test, which identifies the residual metrics computed in block 102 that cross a specified threshold value.

Detected discontinuities in the first output that are false or missed, are detected in block 106 by comparing the detected discontinuities in the first output with regular gimbal motion estimates (estimates of a regularity of gimbal motion). In block 108, the true discontinuities in the first output and the missed discontinuities in the first output are outputted as estimates of the inception or beginning gimbal motion time, to a system clock for clock synchronization.

The gimbal motion of the IMU of interest, will have known periodicity of finite accuracy, $T_{per}$, in that the gimbal clock has finite accuracy (as in one part per million, which must be tracked over the course of months). For example, the IMU with its one or more component gyroscopes, may be rotated with roll and azimuth gimbals to another orientation every five minutes, the order of gimbal motions may be repeated every N, for example, 64, orientations, and the gimbal motion may take, for example, ten seconds. The period over which the gimbals move will be referred to as $T_{man}$ herein. Based on the imperfectly known periodicity, the method assigns early gimbal motion times that may have been missed (block 106). The process used to determine beginning gimbal motion times may miss beginning gimbal motion due to false alarms (threshold crossings not contained within the maneuver period of time length $T_{man}$). When the final beginning gimbal motion times are determined (block 108), the method (if performed in non real-time) inserts beginning gimbal motion times (using the estimates of the regularity of gimbal motion onset, as a template) in multiples of $T_{per}$ seconds before the first beginning gimbal motion time is clearly detected and the start of the data.

Figure 2:
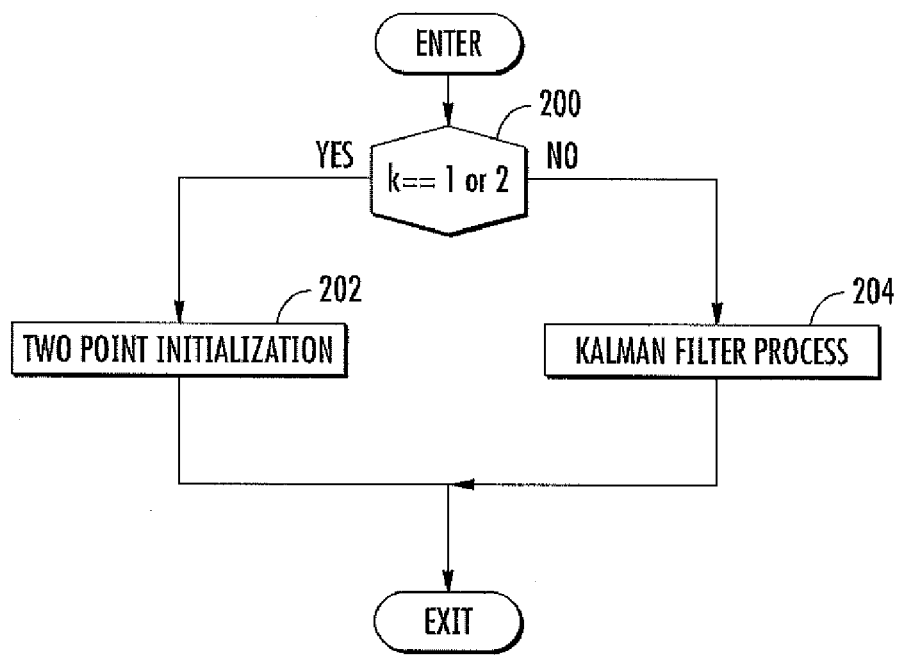
FIG. 2 is a logic flow diagram of an embodiment of an adaptive Kalman filter.

FIG. 2 is a logic flow diagram of an embodiment of an adaptive Kalman filter that may be used in the method of FIG. 1 to independently filter the three-axis angular orientation rate information, thereby computing the residual metrics for each angular orientation rate estimate. In block 200, a determination is made as to whether an instance or iteration k of a received measurement of gyroscope three-axis angular orientation rate information or data is one of the first two measurements corresponding to the first time steps $t_k$, where k=1 or k=2, or if the process has exceeded the first two measurements corresponding to a time step $t_k$, where k>2. If k is equal to 1 or 2, in block 200, a two point initialization of variables process is performed in block 202 using the time step information from the first two time steps $t_k$ (i.e., k=1 and k=2). If k is not equal to 1 or 2 (i.e., greater than 2) in block 200, for each time step $t_{k>2}$, of received measurement data, the Kalman filter computes a residual metric for the angular orientation rate information or data of each axis (roll pitch, and heading) of the gyroscope using the initialization from the first two time points.

Figure 3:
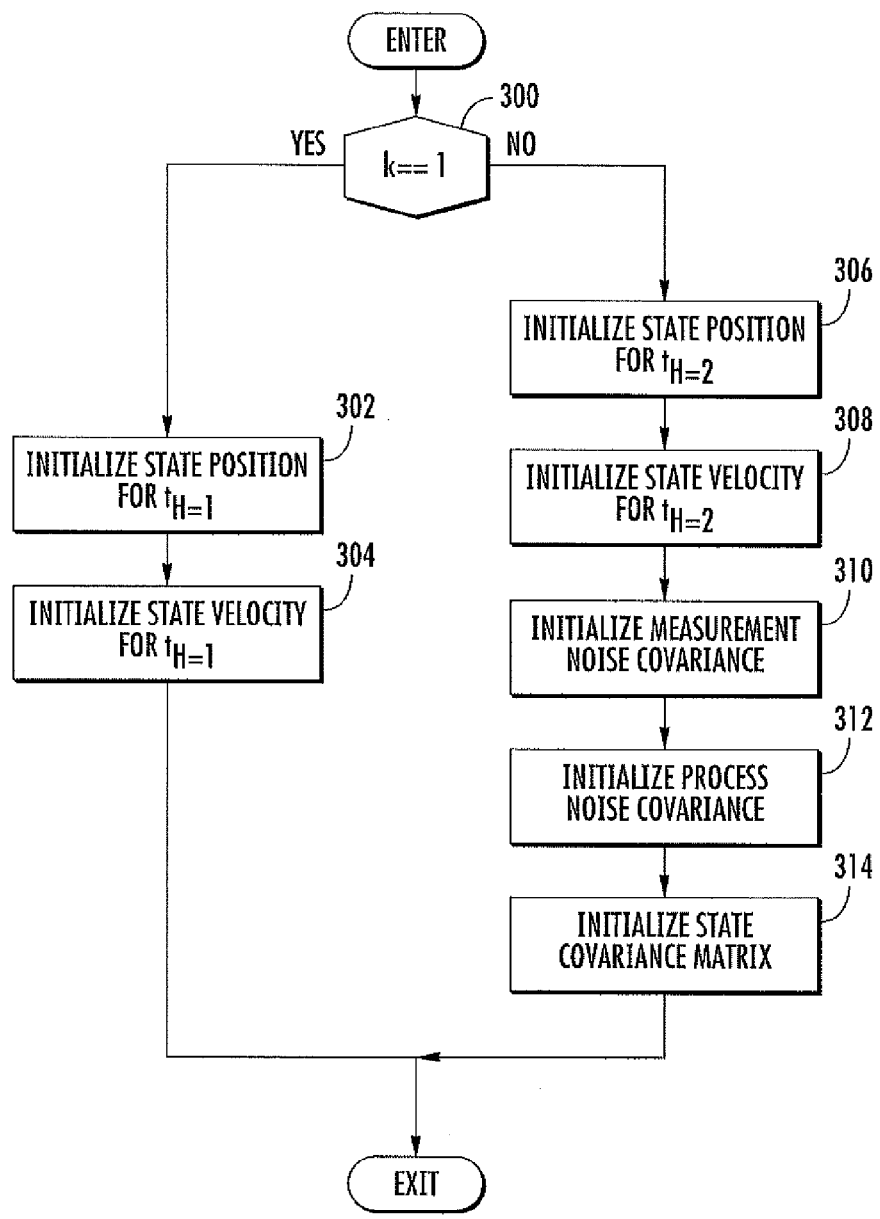
FIG. 3 is a logic flow diagram of an embodiment of a two point filter initialization process.

FIG. 3 is a logic flow diagram of an embodiment of the two point filter initialization process performed in block 202 in FIG. 2. In block 300, a determination is made as to whether an instance k of a received measurement of gyroscope three-axis angular orientation rate information or data is a first measurement corresponding to a first time step $t_k$, where k=1. If instance k is equal to 1, a state position variable for the first time step $t_{k=1}$ is initialized in block 302 and a state velocity variable for the first time step $t_{k=1}$ is initialized in block 304. If instance k is not equal to 1, a state position variable for the second time step $t_{k=2}$ is initialized in block 306, a state velocity variable for the second time step $t_{k=2}$ is initialized in block 308, a measurement noise covariance variable is initialized in block 310, a process noise covariance variable is initialized in block 312, and a state covariance matrix variable is initialized in block 314.

The details of the two point initializing process performed for the variables in each of blocks 302, 304, 306, 308, 310, 312, and 314 will now be described with reference to the following filter notation definitions where the state estimate $\hat{x}(k|n)$, is the estimate of the true state x(i), at time step $t_k$ where n defines the total number of measurements received (k=1, 2, 3 ... n), given angular orientation rate measurements z(1), z(2), ..., z(n) at times $t_1, t_2, ..., t_n$, and the state vector comprises two components, the attitude rate $\xi_1(k)$ and the attitude acceleration $\xi_2(k)$, which is the time-derivative of the attitude rate $\xi_1(k)$. The two point initialization process is based on the measurements of attitude rate, $a_{meas}(1)$ and $a_{meas}(2)$, corresponding to the first two time steps. It is assumed that the first measurement arrives at time step $t_k$, corresponding to k=1, and that the second measurement arrives at time step $t_k$, corresponding to k=2. A time step is now defined as $T_k=t_k-t_{k-1}$. It is not assumed the time difference $T_k$ will remain perfectly constant throughout processing, although expected in the tactical setting. The estimated state vector, $\hat{x}(2|2)$, for this time point is then calculated. The estimated attitude rate is the attitude measurement at time $t_2$, and the estimated attitude acceleration is the difference between the first and second attitude measurements, divided by the time difference $T_k$. The initialization based on the first two measurements can be represented by equations:

$$\xi_1(2|2) = a_{meas}(2),$$

which defines the attitude rate at time 2, $\xi_1(2|2)$, as being equal to the measured attitude rate at time 2, $a_{meas}(2)$; and $$\xi_2(2|2) = \frac{a_{meas}(2) - a_{meas}(1)}{T_k},$$

which defines the attitude acceleration at time 2, $\xi_2(2|2)$, as being equal to the difference in the first two measured attitude rates divided by the time difference between the first two times. Combining these equations, the estimated state $\hat{x}(2|2)$ is expressed as $$\hat{x}(2|2) = \begin{bmatrix} \xi_1(2|2) \\ \xi_2(2|2) \end{bmatrix} = \begin{bmatrix} a_{meas}(2) \\ \frac{a_{meas}(2) - a_{meas}(1)}{T_k} \end{bmatrix}.$$

The state covariance matrix P, a function of the measurement noise variance $\sigma_M^2$, and $T_{k0}$, is initialized as $$P = \begin{bmatrix} \sigma_M^2 & 0 \\ 0 & \frac{2\sigma_M^2}{T_{k0}^2} \end{bmatrix}.$$

The initialization method also initializes the measurement standard deviation $\sigma_{M0}$, $\sigma_{M0}$=0.25 Milliradians/sec.

The process noise standard deviation used is, $\sigma_Q$=30 Milliradians/sec³.

Figure 4:
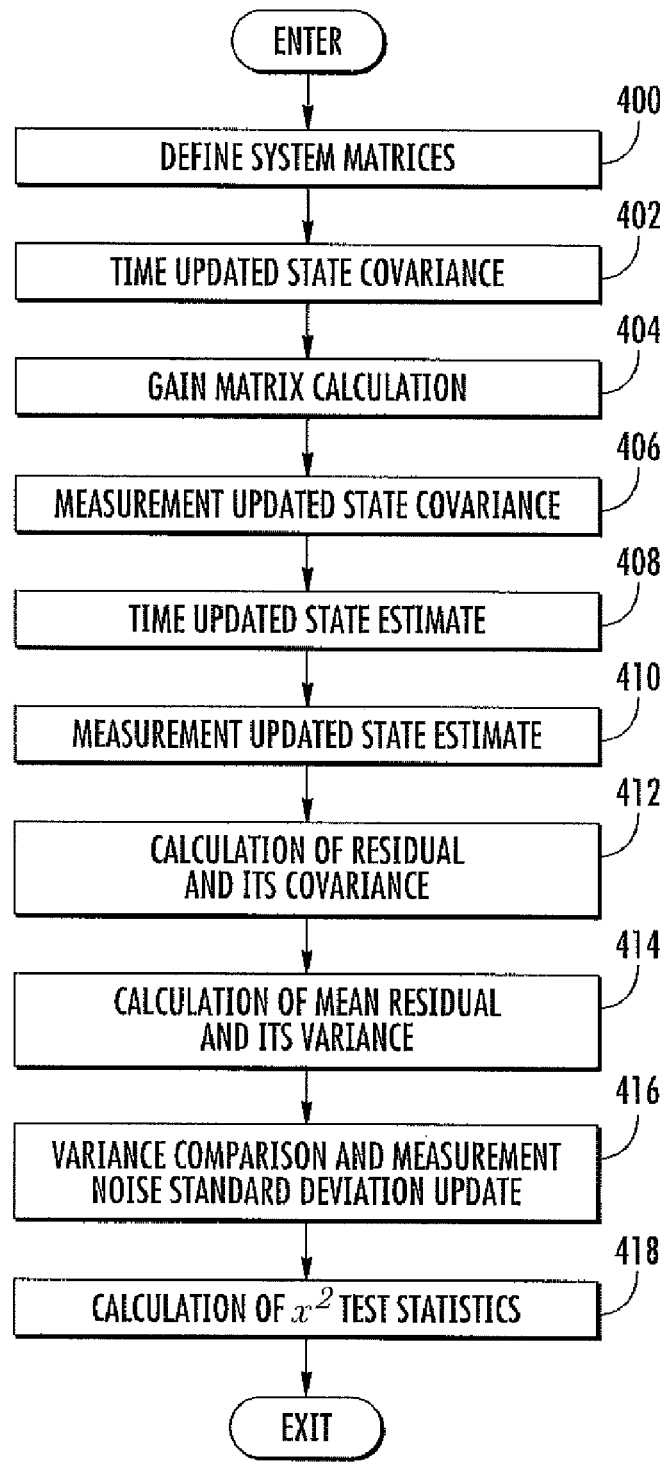
FIG. 4 is a logic flow diagram of an embodiment of the Kalman filter process.

FIG. 4 is a logic flow diagram of an embodiment of the Kalman filter process performed in block 204 in FIG. 2. In block 400 of the Kalman filter process, linear dynamic system matrices are defined. Specifically, all calculations performed in the Kalman filter process are based on a model where attitude rate $\xi_1(k|k)$ is expressed as:

$$\xi_1(k+1 \mid k) = \xi_1(k \mid k) + T_k \xi_2(k \mid k) + \frac{T_k^2}{2} w(k),$$

attitude acceleration $\xi_2(k|k)$ is expressed as:

$$\xi_2(k+1|k) = \xi_2(k|k) + T_k w(k),$$

and w(k) is zero mean Gaussian white process noise jerk with variance $\sigma_Q^2$, defined previously. Attitude rate measurements are modeled as:

$$z(k|k) = \xi_1(k|k) + n(k|k),$$

where n(k|k) is sensor measurement noise with zero mean and variance $\sigma_{M0}^2$, initialized previously. Knowing the state vector x(k|k), the attitude rate and attitude acceleration expressions can be re-written respectively as:

$$x(k+1|k) = Fx(k|k) + G(k)w(k)$$

$$z(k|k) = Hx(k|k) + n(K)$$

where F is a transition matrix given by:

$$F = \begin{bmatrix} 1 & T_k \\ 0 & 1 \end{bmatrix},$$

G(k) is an input matrix given by:

$$G(k) = \begin{bmatrix} T_k^2/2 \\ T_k \end{bmatrix},$$

and H is an observation matrix given by:

$$H = [1 \; 0].$$

Process noise matrix Q(k) is given by:

$$Q(k) = G(k)\sigma_Q^2 G(k)' = \sigma_Q^2 G(k)G(k)' = \begin{bmatrix} \frac{T_k^4}{4} & \frac{T_k^3}{2} \\ \frac{T_k^3}{2} & T_k^2 \end{bmatrix} \sigma_Q^2.$$

In block 402 of the Kalman filter process, a time updated state covariance represented by P(k+1|k)=F P(k|k) F'+Q(k), is predicted, where (k+1|k) is the predicted state.

In block 404 of the Kalman filter process, a gain matrix represented by K(k+1)=P(k+1|k)H' (H P(k+1|k) H'+$\sigma_M^2$)$^{-1}$, is calculated.

In block 406 of the Kalman filter process, a measurement updated state covariance represented by, L=I−K(k+1)H where I is an identity matrix, and P(k+1|k+1)=L P(k+1|k)L'+ K(k+1)$\sigma_M^2$ K(k+1)', is the updated estimate using the Kalman gain matrix K(k+1) of block 404, wherein (k+1|k+1) is the updated state.

In block 408 of the Kalman filter process, a time updated state estimate represented by x̂(k+1|k)=F x̂(k|k) is predicted.

In block 410 of the Kalman filter process, a measurement updated state estimate represented by x̂(k+1|k+1)=F x̂(k|k)+ K(k+1)[z(k+1)−H x̂(k+1|k)] is updated using the Kalman gain matrix K(k+1) of block 404.

After determining the Kalman equations of calculated in blocks 402, 404, 406, 408, and 410, an attitude rate residual r represented by r(k+1)=z(k+1)−H x̂(k+1|k) and it covariance S represented by S(k+1)=H P(k+1|k) H'+$\sigma_M^2$, are calculated in block 412.

A mean residual r̄ represented by r̄(k+1)=(1−$\alpha_\mu$)* r̄(k)+$\alpha_\mu$*r(k+1) where r̄(k) is initialized to 0 (zero), and 0<$\alpha_\mu$<1 (where $\alpha_\mu$ is common filtering gain multiplier that is experimentally optimized, e.g., $\alpha_\mu$ may be 0.1); and its covariance $\sigma_r^2(k)$ represented by, $$\sigma_r^2(k+1) = (1 - \alpha_\sigma) * \sigma_r^2(k) + \alpha_\sigma * \frac{(2 - \alpha_\sigma)}{2} * (r(k+1) - \bar{r}(k+1))^2,$$

where $\sigma_r^2(k)$ is initialized to 0 (zero), and 0<$\alpha_\sigma$<1, (e.g., $\alpha_\sigma$ may be 0.1) are calculated in block 414.

In block 416, the Kalman filter performs a plurality of variance comparisons. In one embodiment, the Kalman filter performs the variance comparisons every 100 seconds. During this comparison, the Kalman filter checks whether the sum of the standard deviation of the residual $\pi_r$(k+1), plus a value of 0.05 or other suitable value, is greater than the square root of the maximum of all the residual covariances S(k), thus far. If the sum of the standard deviation of the residual $\sigma_r$(k+ 1), plus 0.05 is greater than the square root of the maximum of all the residual covariances S(k) twice in a row, the standard deviation of the measurement noise $\sigma_M$ is increased by a value of 0.05 or other suitable value, or the value of $\sigma_M$ remains the same. The updated standard deviation of the measurement noise $\sigma_M$ is what allows the Kalman filter to adapt as necessary for the varying noise in the measurement data of different vehicles on which the system is mounted or associated with (e.g., different ship hulls) and between roll, pitch, and heading per vehicle.

In block 418, a normalized innovation chi-squared $\chi^2$ statistic M represented by, $$M = \frac{r(k+1)^2}{S(k+1)},$$

is determined. The Kalman filter tests this assumed chi-squared $\chi^2$ distributed statistic exceeding a threshold to determine maneuver times. In one embodiment, the threshold used is $\chi_a^2$=12 corresponding to a false alarm probability of 0.0005. Exceeding the threshold is deemed a maneuver detection, indicating the onset of gimbal movement, equivalent to time of index. In other embodiments, the threshold may be other chi-squared distributed static values.

Figure 5:
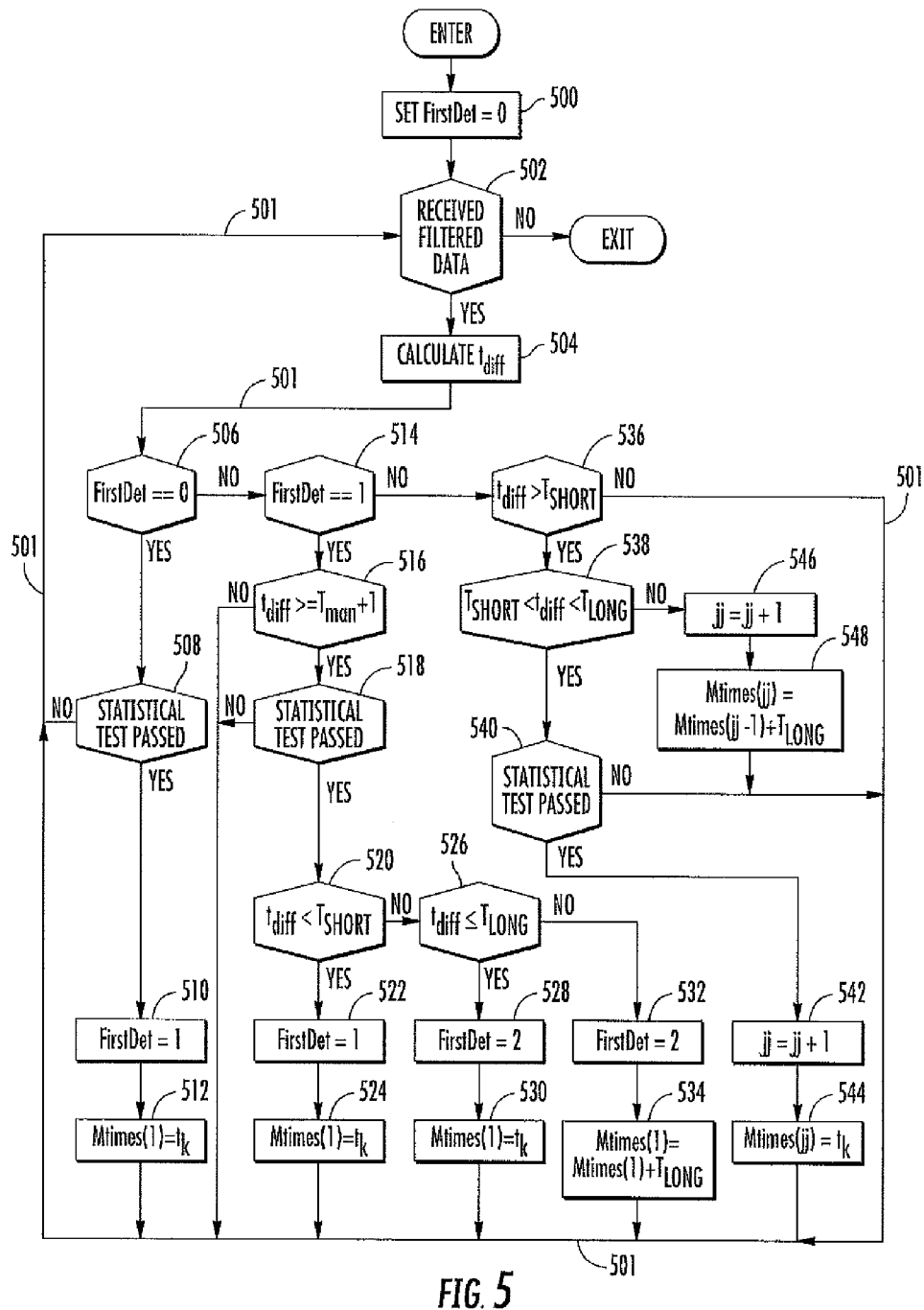
FIG. 5 is a logic flow diagram of an embodiment of a statistical (chi-squared $\chi^2$) test process for discontinuity detection and a test for false or missed declaration of discontinuity.

FIG. 5 is a logic flow diagram of an embodiment of the statistical (chi-squared $\chi^2$) test process (discontinuity detection) and the test for false or missed declaration of discontinuity performed in blocks 104 and 106 of FIG. 1, to estimate the times of gimbal motion. In block 500, variables and processing flags to be utilized in the process are defined. In one embodiment, the processing flag for whether a first maneuver detection FirstDet has occurred is set to zero, the first value in the array of maneuver times Mtimes(1) is set to zero, and a counter jj, which is used to increment the index into Mtimes, is set to one.

In block 502, the process decides whether Kalman filtered data has been received. The process to be described further on continues indefinitely, in time loop 501, as long as measurement data is received in block 502.

If Kalman filtered data has been received in block 502, a time difference $t_{DIFF}$ is calculated in block 504 between a current time $t_k$ and a most recent time of gimbal maneuver from Mtimes. This calculation may be represented by $t_{DIFF}=t_k$−Mtimes(jj).

In block 506, a determination is made as to whether a first index has been detected. If the value of a flag FirstDet is determined to be 0 (zero) in block 506, the process checks in block 508 if a statistical test has been passed by any of the three rates (roll, pitch and heading). If the statistical test has not been passed, in this embodiment a threshold crossing in the $\chi^2$ test, no action is taken and the process returns to the beginning of the time loop 501 and the processes of blocks 502 and 504 are repeated. If the threshold has been crossed in block 508, the flag FirstDet is set to 1 in block 510, corresponding to a possible detection, and a tentative initial time of gimbal motion is set in block 512 to the current time as Mtimes(1)=$t_k$.

The process returns to the beginning of the time loop 501 and the processes of blocks 502 and 504 are repeated. With the flag FirstDet now set to one, when a determination is made as to whether an initial maneuver has occurred and the logic reaches block 506, the process decides in block 514 whether only one tentative index has been determined by examining whether the value of the flag FirstDet is equal 1. If the value of the flag FirstDet is equal 1 in block 514, the process determines in block 516 whether the gyro is in its maneuver period of length $T_{man}$ by testing if the time difference is greater than or equal to $T_{man}$+1 seconds.

If the time difference is determined in block 516 to be less than $T_{man}$+1 seconds, the gyro may still be maneuvering, so no action is taken and the process returns to the beginning of the time loop 501 and the processes of blocks 502 and 504 are repeated. If the time difference is determined in block 516 to be greater than or equal to $T_{man}$+1, the period of gimbal motion has ended and the process again checks, whether the statistical test has been passed by any of the three rates in block 518, i.e., checks for threshold crossings via the $\chi^2$ test. If no crossings are found in block 518, no action is taken and the process returns to the beginning of the time loop 501. If a threshold is broken in block 518, the process must determine whether the original crossing, or possibly the current crossing, was a false alarm. This is accomplished by determining in block 520 whether the time difference $t_{DIFF}$ in seconds is less than a lower limit on the maneuver time difference based on the periodicity of the system and a desired error tolerance $T_{SHORT}$. In one embodiment where the system is the AN/WSN-7 with a 300 second system periodicity, a $T_{SHORT}$ of 298 seconds would be suitable.

If the time difference $t_{DIFF}$ is determined in block 520 to be less than $T_{SHORT}$ seconds, the time difference $t_{DIFF}$ indicates that one of the threshold crossings was a false alarm, and the flag FirstDet is held at a value of 1 in block 522, the time of the initial gimbal motion is reset in block 524 to the current time $t_k$ and the process returns to the beginning of the time loop 501 where the processes of blocks 502 and 504 are repeated. If the time difference $t_{DIFF}$ is determined to be greater than or equal to $T_{SHORT}$ in block 520, and determined to be less than or equal to an upper limit on the maneuver time difference based on the periodicity of the system and a desired error tolerance $T_{LONG}$ in block 526, the threshold crossings are assumed to be correct and the flag FirstDet is set to 2 in block 528 ($t_{DIFF}$ less than or equal to $T_{LONG}$), and the first true time of maneuver Mtimes(1) is reset to the current time $t_k$ in block 530 ($t_{DIFF}$ less than or equal to $T_{LONG}$). If the time difference $t_{DIFF}$ is determined to be greater than or equal to $T_{SHORT}$ in block 520, and determined to be greater than $T_{LONG}$ in block 526, then the threshold crossings are assumed to be correct and the flag FirstDet is set to 2 in block 532 ($t_{DIFF}$ greater than $T_{LONG}$), and the first true time of maneuver Mtimes(1) is reset to the previous value of Mtimes(1) plus $T_{LONG}$, shown as Mtimes(1)=Mtimes(1)+$T_{LONG}$ in block 534 ($t_{DIFF}$ greater than $T_{LONG}$). A $T_{LONG}$ of 300.06 seconds would be suitable, for example but not limited to, in the earlier embodiment of the AN/WSN-7. The process returns to the beginning of the time loop 501 and the processes of blocks 502 and 504 are repeated.

Once the initial time of gimbal motion has been correctly identified in blocks 524, 530 or 534, there is no need to check for threshold crossings until $T_{SHORT}$ seconds after the previous index, since each indexing cycle is the known periodicity of the gimbal motion $T_{PER}$ seconds ($T_{PER}$ is 300 seconds in the embodiment of the AN/WSN-7). The difference between $T_{PER}$ and $T_{SHORT}$ will allow correction if the first maneuver time was determined late. If the time difference $t_{DIFF}$ is determined in block 536 to be less than $T_{SHORT}$ seconds, nothing happens and the process returns to the beginning of the time loop 501. If the time difference is determined in block 536 to be greater than $T_{SHORT}$ and is determined in block 538 to be between $T_{SHORT}$ and $T_{LONG}$, the process determines whether a threshold crossing has been achieved in block 540. If a threshold crossing has been achieved in block 540, the counter of maneuver times jj is incremented by one in block 542, and the current maneuver time Mtimes(jj) is set in block 544 to the current time $t_k$ as Mtimes(jj)=$t_k$. If it has been determined in block 540, that no threshold has been crossed, the process returns to the beginning of the time loop 501.

If it has been determined in block 538 that the time difference $t_{DIFF}$ is greater than $T_{LONG}$, the maneuver is late and the counter of maneuver times jj is incremented by one in block 546, and the current time of index is forced to $T_{LONG}$ seconds after the previous maneuver time in block 548, shown as Mtimes(jj)=Mtimes(jj−1)+$T_{LONG}$. The process then returns to the beginning of the time loop 501 and keeps determining maneuver times as long as data is determined in block 500 to be received.

Figure 6:
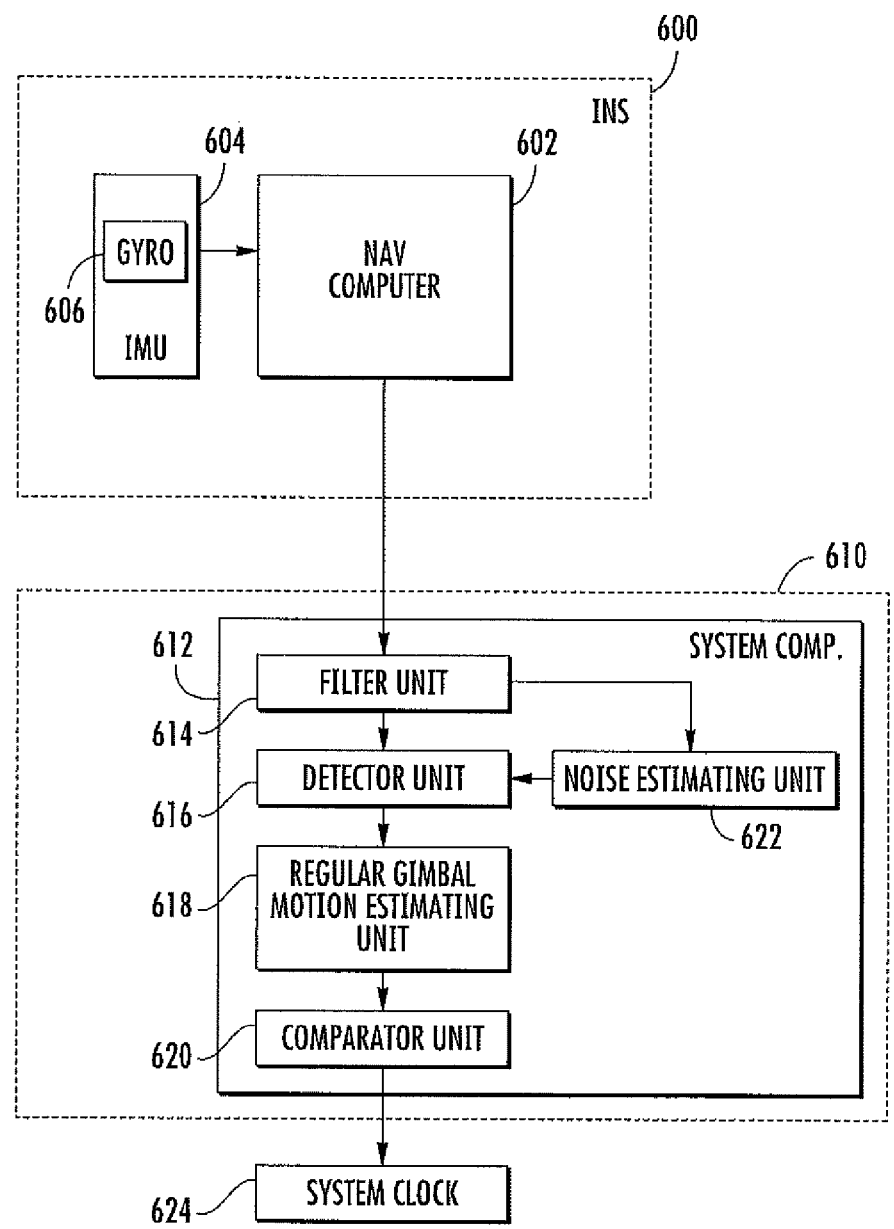
FIG. 6 is a block diagram of an embodiment of an Inertial Navigation System and an embodiment of a templated adaptive maneuver detection system that implements the templated adaptive maneuver detection method for chick synchronization.

FIG. 6 is a block diagram of an embodiment of an Inertial Navigation System (INS) 600 and a templated adaptive maneuver detection system (TAMDS) 610 for implementing the earlier described templated adaptive maneuver detection method for clock synchronization. In one embodiment, the TAMDS 610 may be a component of a combat and/or weapons system. The INS comprises a navigation computer 602 and one or more inertial measurement units (IMUs) 604 in data communication with the navigation computer 602. The one or more IMUs 604 include one or more gyroscopes 606 that provide angular rate (roll, pitch, and heading) information or data to the navigation computer 602, which allows the INS 600 to automatically and continuously calculate and indicate the roll, pitch, and heading of a vehicle (not shown), such as, but not limited to a ship, a missile, and a rocket, in relation to the earth's rotation. The TAMDS 610 comprises a system computer 612 and a system clock 624 in data communication with the system computer 612. In one embodiment, the system clock 624 may be a clock that is used for running the processes of a combat and/or weapons system. The system computer 612 includes a filter unit 614, a detector unit 616, a regular gimbal motion estimating unit 618, a comparator unit 620, and a noise estimating unit 622.

The system computer 612 of the TAMDS 610, including the filter unit 614, the detector unit 616, the regular gimbal motion estimating unit 618, the comparator unit 620, and the noise estimating unit 622, may include without limitation a mainframe computer system, a workstation, a personal computer system, a personal digital assistant (PDA), or other device or apparatus having at least one processor that executes instructions from a memory medium. The system computer 612 may include one or more memory mediums on which one or more computer programs or software components may be stored. The one or more software programs which are executable to perform the methods described herein, may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

Further, the system computer 612 including the filter unit 614, the detector unit 616, the regular gimbal motion estimating unit 618, the comparator unit 620, and the noise estimating unit 622 may also be implemented in hardware, a combination of software and hardware, or in other suitable implementations. The methods described herein implemented in software may be executed by the processor of the system computer 612 or the processor or processors of the one or more associated computers or computer systems connected to the system computer 612.

While exemplary drawings and specific embodiments of the present disclosure have been described and illustrated, it is to be understood that that the scope of the invention is not to be limited to the particular embodiments discussed. Thus, the embodiments shall be regarded as illustrative rather than restrictive, and it should be understood that variations may be made in those embodiments by workers skilled in the arts without departing from the scope of the invention as set forth in the claims that follow and their structural and functional equivalents.

What is claimed is:

1. A method for estimating the inception of gimbal motion of an inertial measurement unit (IMU), the method comprising the steps of:
    independently filtering, in a computer process, three-axis angular orientation rate information or data from component gyroscopes in the IMU, to provide a first output;
    adaptively detecting, in another computer process, discontinuities in the first output;
    estimating a regularity of gimbal motion to provide a second output;
    comparing the discontinuities detected in the first output to the estimated regularity of gimbal motion provided in the second output, in another computer process, to determine which of the discontinuities detected in the first output are true discontinuities and which of the discontinuities in the first output that are false discontinuities, and to identify other discontinuities which have been missed in the first output;
    wherein the true and missed discontinuities are estimates of the inception of gimbal motion of the IMU.

2. The method of claim 1, wherein the detecting step is performed by a statistical test.

3. The method of claim 2, wherein the filtering step is performed with a Kalman filter, the first output comprising Kalman filter residuals and wherein the statistical test comprises a chi-squared test performed on the Kalman filter residuals.

4. The method of claim 2, wherein the statistical test comprises a chi-squared test.

5. The method of claim 1, further comprising the step of adaptively estimating noises in the three-axis angular orientation rate information or data of the first output, in another computer process, to accommodate gyroscope to gyroscope differences.

6. The method of claim 5, wherein the noise estimating step is performed by estimating a standard deviation of the noises in individual axes of the angular orientation rate information or data of the first output.

7. The method of claim 1, wherein the step of estimating the regularity of gimbal motion is performed with least squares.

8. The method of claim 1, further comprising the step of applying the estimates of the inception of the gimbal motion of the IMU to a system clock.

9. A system for estimating the inception of gimbal motion of an inertial measurement unit (IMU), the system comprising:
    a filter unit for independently filtering gyroscope three-axis angular orientation rate information or data from component gyroscopes in the IMU, to provide a first output;
    a detector unit for adaptively detecting discontinuities in the first output;
    a regular gimbal motion estimating unit for estimating a regularity of gimbal motion to provide a second output;
    a comparator unit for comparing the discontinuities detected in the first output to the estimated regularity of gimbal motion provided in the second output to determine which of the discontinuites detected in the first output are true discontinuites and which of the discontinuities in the first output that are false discontinuities, and to identify other discontinuities which have been missed in the first output,
    wherein the true and missed discontinuities are estimates of the inception of gimbal motion of the IMU.

10. The system of claim 9, wherein the detector unit detects discontinuities in the first output by performing a statistical test.

11. The system of claim 10, wherein the filter unit comprises a Kalman filter and the first output comprises Kalman filter residuals, and wherein the statistical test comprises a chi-squared test performed on the Kalman filter residuals.

12. The system of claim 10, wherein the statistical test comprises a chi-squared test.

13. The system of claim 9, further comprising a noise estimating unit for adaptively estimating noises in the three-axis angular orientation rate information or data of the first output to accommodate gyroscope to gyroscope differences.

14. The system of claim 13, wherein the noise estimating unit estimates a standard deviation of the noises in the three-axis angular orientation rate information or data of the first output.

15. The system of claim 9, wherein the regular gimbal motion estimating unit estimates the regularity of gimbal motion with least squares.

16. The system of claim 9, wherein the filter unit, the detector unit, the regular gimbal motion estimating unit, and the comparator unit form a computer system and further comprising a system clock in data communication with the computer system, wherein the computer system applies the estimates of the inception of the gimbal motion of the IMU to the system clock.

* * * * *